United States Patent [19]
Bulling et al.

[11] Patent Number: 5,161,322
[45] Date of Patent: Nov. 10, 1992

[54] APPARATUS AND METHOD FOR HANGING FISHING NETS

[75] Inventors: Siegfried Bulling; John Barrett; Blayney J. Scott, all of Victoria, Canada

[73] Assignee: Scott Plastics Ltd., Victoria, Canada

[21] Appl. No.: 623,059

[22] Filed: Dec. 6, 1990

[51] Int. Cl.$^5$ .............................................. A01K 73/02
[52] U.S. Cl. ........................................ 43/9.8; 256/23; 403/208; 43/14; 43/44.91
[58] Field of Search ................ 43/7, 9.8, 10, 14, 43.1, 43/44.9, 44.91; 256/23; 403/206, 208; 24/459

[56] References Cited
U.S. PATENT DOCUMENTS

| | | | |
|---|---|---|---|
| 1,599,342 | 9/1926 | Muhlfeld | 403/206 |
| 1,746,090 | 2/1930 | Rechter | 403/206 |
| 2,131,609 | 3/1939 | Menderman | 43/44.91 |
| 3,457,598 | 7/1969 | Mariani | 24/16 |
| 3,597,803 | 8/1971 | Van Neil | 24/16 PB |
| 3,688,431 | 9/1972 | Nichols | 43/43.14 |
| 3,757,031 | 9/1973 | Izraeli | 24/459 |
| 4,317,262 | 3/1982 | Wells, Jr. | 24/16 PB |
| 4,644,679 | 2/1987 | Ban | 43/7 |
| 4,693,031 | 9/1987 | Koetje | 43/44.91 |
| 4,763,432 | 8/1988 | Barclay | 43/7 |
| 4,805,334 | 2/1989 | Barclay | 43/7 |
| 4,845,877 | 7/1989 | Koetje | 43/7 |
| 5,014,459 | 5/1991 | Sublet | 43/43.1 |

FOREIGN PATENT DOCUMENTS 1559036  3/1969  France .................................. 24/459
0083005 11/1919  Switzerland ........................ 403/206

Primary Examiner—Richard K. Seidel
Assistant Examiner—James Miner
Attorney, Agent, or Firm—Bull, Housser & Tupper

[57] ABSTRACT

A net web is supported by upper and lower float and weight lines by a connecting structure which is connected to the respective line to resist movement along the line. Each connecting structure has an outer portion with a locking opening therein and cooperates with a cord loop. An inner loop end portion of the cord loop cooperates with the line and the connecting structure to resist movement along the line. An outer loop end portion passes through the selvage of the fish net web and cooperates with an adjacent connecting structure and its associated loop. The cord loop of one connecting structure passes through the locking opening in an adjacent connecting structure, and a cord loop of the said adjacent connecting structure passes through the cord loop of the said one structure to interfere therewith to prevent separation of the cord loop of the said one structure from the adjacent connecting structure. This essentially prevents unintentional unravelling of the cord loops from adjacent connecting means should one cord loop be severed. The structure permits easy connection and disconnection of a fish net web from cooperating float and weight lines, thus significantly reducing skill and labor costs for hanging and repairing nets.

45 Claims, 8 Drawing Sheets

APPARATUS AND METHOD FOR HANGING FISHING NETS

BACKGROUND OF THE INVENTION

The invention relates to an apparatus and method for supporting a net web, for example for connecting a net web to a float line and a weight line as used in commercial fishing.

For many years, a light net web as used in commercial fishing, e.g. gill-netting, has been supported from a float line floating on the water surface, and has been maintained vertical by a weight line hanging from a lower edge of the net web. The net web has selvages defining spaced parallel edges of the net, which are connected to the float line and weight line as required using lengths of light twine or cord. Each length of cord is threaded through the selvage and connected by knots to the respective line at evenly spaced intervals along the length of the line. The float line also carries a plurality of floats which support the weight of the net, the floats being spaced evenly along the line and located in place by the cord knots connecting the web to the float line.

As stated above, the net web is connected to the float line and weight line by knotting with a light cord, and is skilled and time consuming and detracts from fishing time. Furthermore, modern fishing regulations relating to conservation of fish stocks restrict efficient use of time and materials for hanging net webs or for providing a variety of nets for different purposes. Consequently, if a quick way can be found for connecting a net web to a float line and weight line, productivity of fishermen would be increased.

Several attempts have been made to simplify the connecting of the net web to the float line and weight line which lines can be referred to as support lines. U.S. Pat. Nos. 4,763,432, and 4,805,334, both issued to Barclay, disclose several means of releasably connecting a net web to support lines. Barclay discloses an embodiment which uses a series of releasable connecting means, each of which has one or a pair of cord loops extending therefrom. A relatively long cord loop is threaded through portions of the selvage of the net web to connect the web to the connecting means and is then passed through a shorter cord loop of an adjacent connecting means. Tests have shown that it can be very difficult to positively secure the connecting means of the Barclay patents to the support lines to prevent movement along the support lines. Furthermore should one of the cord loops be cut, uncontrolled unravelling of the net web from the support line might result. Furthermore, Barclay shows use of separate float retaining means, which are connectors secured to the line on opposite sides of each float to prevent movement of the float along the lines. Presumably, this is to relieve the connecting means of load from the floats which can occur as the net is hauled in onto the vessel. Separate connecting means to prevent movement of the floats incurs considerable extra cost and labour when hanging the net.

Other means of releasably connecting net webs to support lines are shown in U.S. Pat. Nos. 4,693,031 and 4,845,877, both issued to Koetje, and U.S. Pat. No. 4,644,679, issued to Ban. These patents similarly show connecting means for connecting a fish net web to support lines.

SUMMARY OF THE INVENTION

The invention provides a means for quickly connecting and releasing a fish net web from support lines, which requires little skill and interferes minimally with normal operation of other fishing gear. Furthermore, the connecting means are secured positively to the support lines, such that movement of the connecting means along the lines under normal operating forces is negligible. Because the present connecting means can be secured positively to the support lines, the floats can be located on the float line between pairs of connecting means, and thus separate float locating or securing means are not required, as found in some prior art devices. In one embodiment, the connecting means are secured to the lines by a relatively simple squeezing or hammering process, which would lend itself easily to an automatic or semi-automatic process for connecting to the lines. Clearly, by eliminating the need for separate float locating means, any automatic process is greatly simplified compared with some prior art devices. In other embodiments, the connecting means are tied onto the line using a cord loop which is also used to connect the net web to the line.

If any of the embodiments, should cords connecting the net web to the line become broken, uncontrolled unravelling or unintentional separation of the net web from the support lines is prevented. While uncontrolled unravelling of the web from the support lines is essentially prevented by the present invention, it is relatively easy and fast to deliberately disconnect the net web from the connecting means, and to re-connect another net web to the connecting means without requiring much skill or incurring high labour costs. It is anticipated that the connecting means can be connected and disconnected many times to permit easy, quick and low cost re-connections of net webs as required.

The apparatus according to the invention connects a net web to a support line, the net web having a selvage. The apparatus comprises at least first and second connecting means and at least first and second lengths of cord formed into first and second cord loops respectively. Each connecting means comprises a body portion and a respective cord securing means for securing a cord loop therein, the securing means having a locking opening. The first and second cord loops have respective inner and outer loop end portions. The first and second inner loop end portions cooperate with the first and second connecting means respectively and the line to resist movement of the connecting means and the respective inner loop end portions along the line. The connecting means and respective inner loop end portions are spaced apart at a distance along the line less than length of the cord loop. The second cord loop passes through the selvage of the net web and extends to the first connecting means. The second cord loop passes through the locking opening of the first connecting means and cooperates with the first cord loop so as to prevent separation of the second cord loop from the first connecting means. The locking opening of the securing means has a minimum size sufficient to receive at least two cord portions of the second cord loop disposed adjacent to each other, and a maximum size to resist passage of the second cord loop containing the first cord loop passed therethrough.

Each body portion has an outer portion and an oppositely located inner portion adjacent the support line. The outer portion has a bridge portion and an adjacent base portion, space between the bridge portion and the base portion defining the locking opening of the securing means. The inner portion has an inner opening to receive the respective cord loop therethrough. Preferably, each body portion has an outer opening and a cavity extending from the inner opening to the outer opening to receive the respective cord loop therethrough.

In one embodiment, each connecting means comprises the body portion and a complementary fastener portion. The portions have securing means for securing the portions together to enclose and grip the support line and the cord loop therebetween with sufficient force to resist movement of the connecting means relative to the line. In another embodiment, the cord loop connects the connecting means to the line.

A connecting apparatus according to the invention is for connecting to a support, the connecting apparatus comprising a body portion having an outer portion and an oppositely located inner portion. The outer portion has a rigid bridge portion and an adjacent base portion, a space between the bridge portion and the base portion defining a locking opening of a cord securing means. The inner portion has an inner opening, the outer portion has an outer opening and a cavity extends from the inner opening to the outer opening. In one embodiment, the body portion also has two fastener openings, and the apparatus further comprises a fastener portion having fastener end portions at opposite ends thereof insertable into respective fastener opening. Rack and pawl means cooperate with the fastener end portions and the first fastener opening to permit insertion of the end portion into the opening, and to resist removal of the end portion from the opening. Preferably, each body portion has a pair of spaced apart fingers, each finger having a finger proximal portion connected to an adjacent body portion, and a finger distal portion. The finger distal portion is separated from the adjacent body portion to permit slight lateral flexing of the finger with respect to the remaining body portion. The fingers are located adjacent the fastener openings to permit cooperation with the fastener end portions so as to force the fingers inwardly when the fastener end portions are inserted into the fastener openings.

A method according to the invention of connecting a net web having a selvage to a support line includes the steps of:

connecting an inner loop end portion of a first cord loop and a first connecting means to the support line so that the inner loop end portion and the connecting means is restricted against movement along the support line, connecting an inner loop end portion of a second cord loop and a second connecting means to the support line so that the inner loop end portion of the second cord loop and the second connecting means are restricted against movement along the support line, the second connecting means being spaced from the first connecting means along the support line at a distance less than length of the second cord loop, passing an outer loop end portion of the second cord loop of the second connecting means through a selvage of the net web to cooperate firstly with the first connecting means and secondly with the first cord loop so as to prevent separation of the second loop from the first connecting means to prevent unintentional disconnection of the loops.

Preferably, the method is further characterized by:

after passing the second cord loop of the second connecting means through a selvage of the net web, passing the second cord loop through a locking opening of the first connecting means, passing the first cord loop of the first connecting means through an outer loop end portion of the second cord loop extending through the locking opening of the first connecting means, and drawing the first cord loop relatively taut, applying a force to the second cord loop so as to draw the first cord loop towards the first connecting means so as to lock the outer loop end portion of the second cord loop with respect to the first connecting means with the first cord loop.

In one method, each cord loop is connected to the line by wrapping an inner loop end portion of the cord loop around the line and passing an outer loop end portion of the line through the inner loop end portion to secure the cord loop to the line by use of a ring knot.

In an alternative method, each cord loop is connected to the line by passing an outer loop end portion of the cord loop through an inner opening of the connecting means and preventing the inner loop end portion from passing therethrough. This is followed by passing the inner loop end portion around the line to secure it thereto by the cord loop, and positioning a remaining portion of the loop adjacent the locking opening to cooperate with a cord loop from an adjacent connecting means passing therethrough.

A detailed disclosure following, related to drawings, describes several apparatus and methods according to the invention, which are capable of expression in structure and method other than those particularly described and illustrated.

DETAILED DISCLOSURE OF PREFERRED EMBODIMENT

FIG. 1

Figure 1:
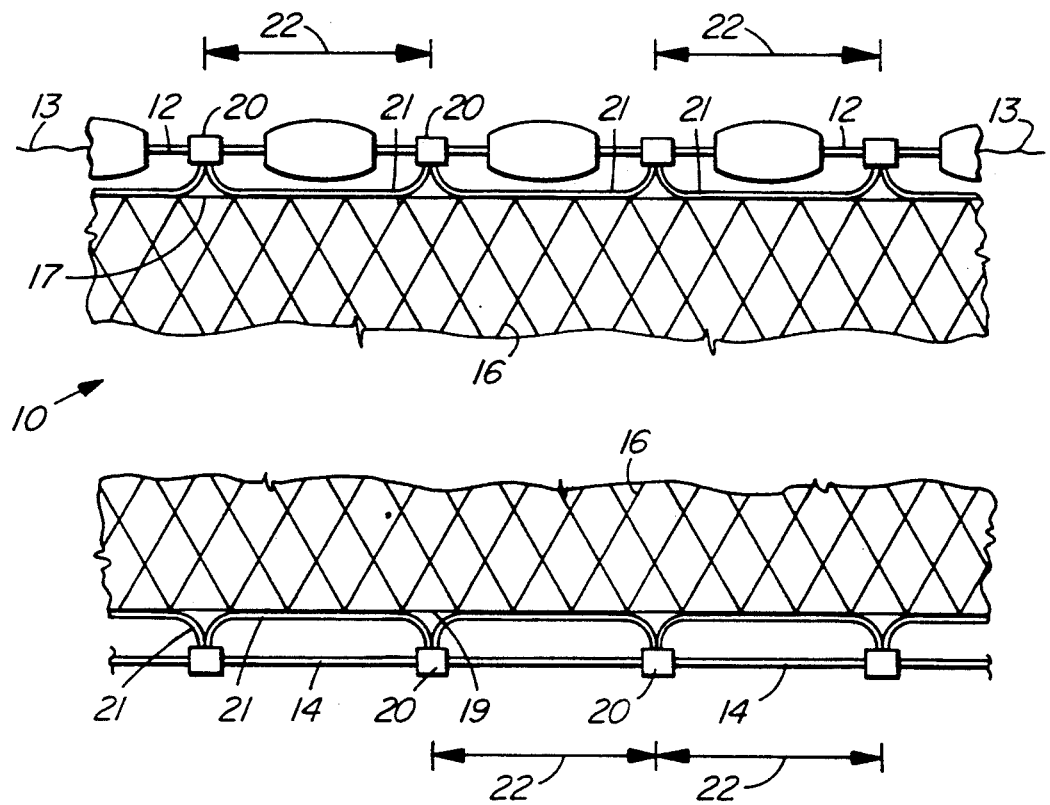
FIG. 1 is a simplified fragmented side elevation of a portion of a gill-net, the gill-net being deployed by an upper float line and a lower weight line, a net web being connected to the lines by a first embodiment of a connecting apparatus according to the invention.

A gill-net assembly 10 has an upper float line or the cork line 12 adjacent surface 13 of the water, and a lower weight line or lead line 14 spaced generally vertically therebeneath. A net web 16 has an upper selvage 17 connected to the float line, and a lower selvage 19 connected to the weight line. For simplicity, the float line and weight line are referred to as support lines or ropes, and each support line carries a plurality of longitudinally spaced apart similar connecting means 20 according to a first embodiment of the invention. A plurality of cord loops 21 extend from the connecting means 20 and pass through the adjacent selvage to connect the web to the support lines. The connecting means and cord loops serve as an apparatus for connecting the web to the support line and will be described in greater detail herein. The connecting means 20 are spaced equally apart along the respective support line at a spacing 22.

The float line 12 carries a plurality of conventional floats 23 spaced therealong, the floats being retained at a particular location on the line by connecting means 20 disposed on opposite sides thereof. The weight line is conventional and has a plurality of lead weights extending therealong, to provide sufficient weight to hold the net web generally vertically when deployed as shown.

Figure 2:
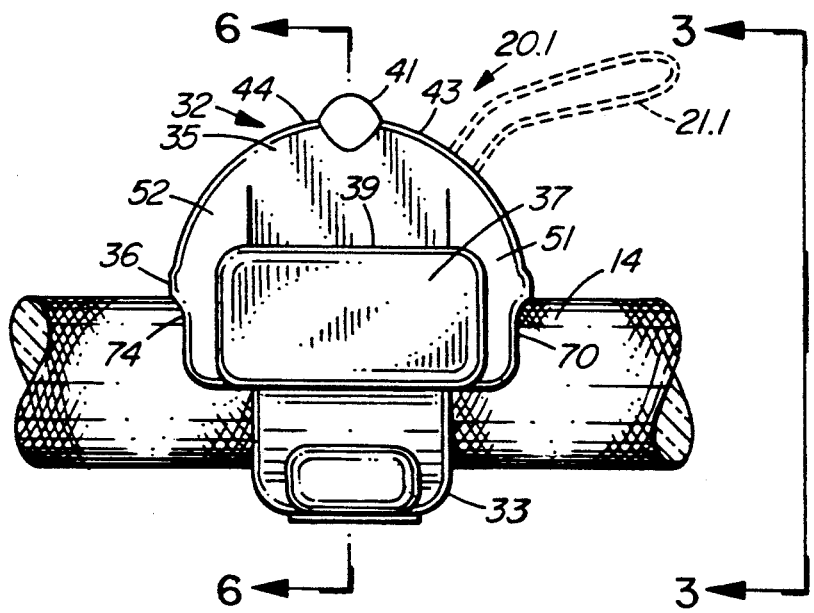
FIG. 2 is a simplified side elevation of the connecting apparatus according to the invention shown connected to a portion of a support line.
Figure 3:
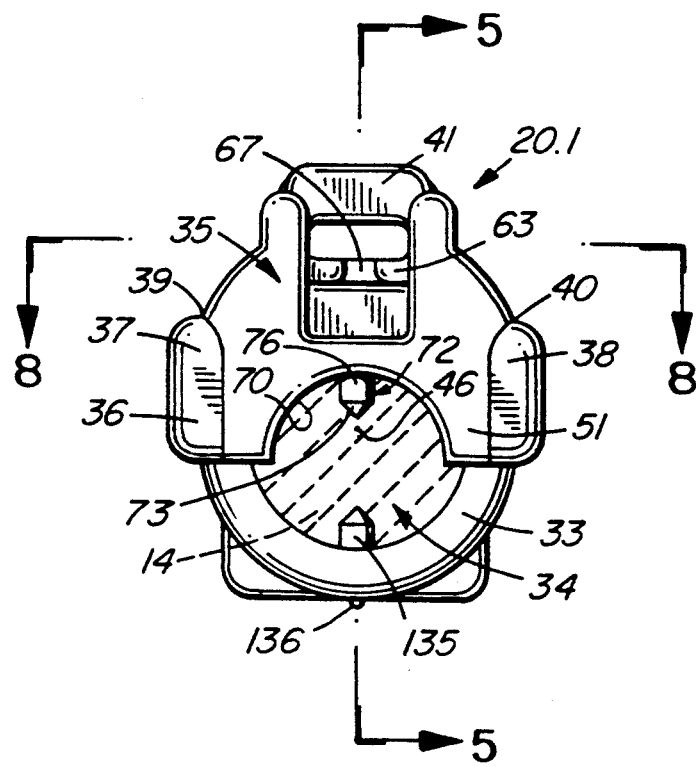
FIG. 3 is a simplified end elevation of the connecting apparatus, as would be seen from Line 3—3 of FIG. 2, a portion of the support line being shown in section.
Figure 4:
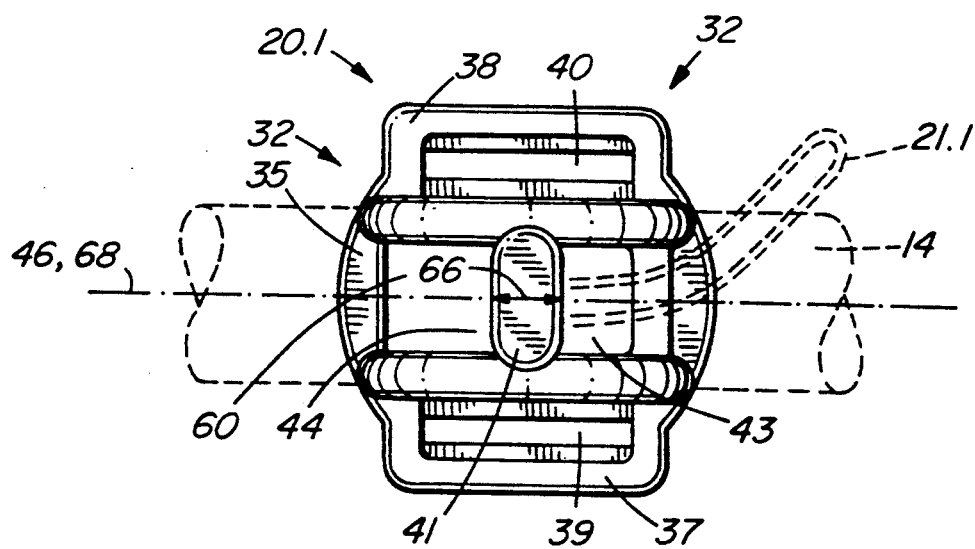
FIG. 4 is a simplified top plan of the connecting apparatus, support line and cord portions being shown in broken outline.

FIGS. 2 through 4

A first connecting means 20.1 according to the invention is shown connected to the weight line 14 and has a body portion 32 and a complementary initially separate fastener portion 33. As seen in FIG. 3, the fastener portion 33 defines with the body portion 32 a line receiving opening 34 to receive and to retain therein the line 14 as will be described. The body portion has an outer portion 35, and an oppositely located inner portion 36 adjacent the line 14. The body has first and second fastener openings 39 and 40 adjacent first and second side portions 37 and 38 which are disposed on opposite sides of the body. The body portion 32 has a bridge portion 41 extending from the outer portion 35 and generally between the opposite sides of the body to provide an outer opening 43 and a locking opening 44 on opposite sides thereof. The body portion is generally symmetrical in plan about a central longitudinal axis 46 which coincides with an axis of the line 12 when the line is essentially straight and undeformed. A first cord loop 21.1, shown in broken line, is secured to the line as will be described and extends outwardly through the outer opening 43 of the body portion 32.

FIGS. 2 through 8

Figure 5:
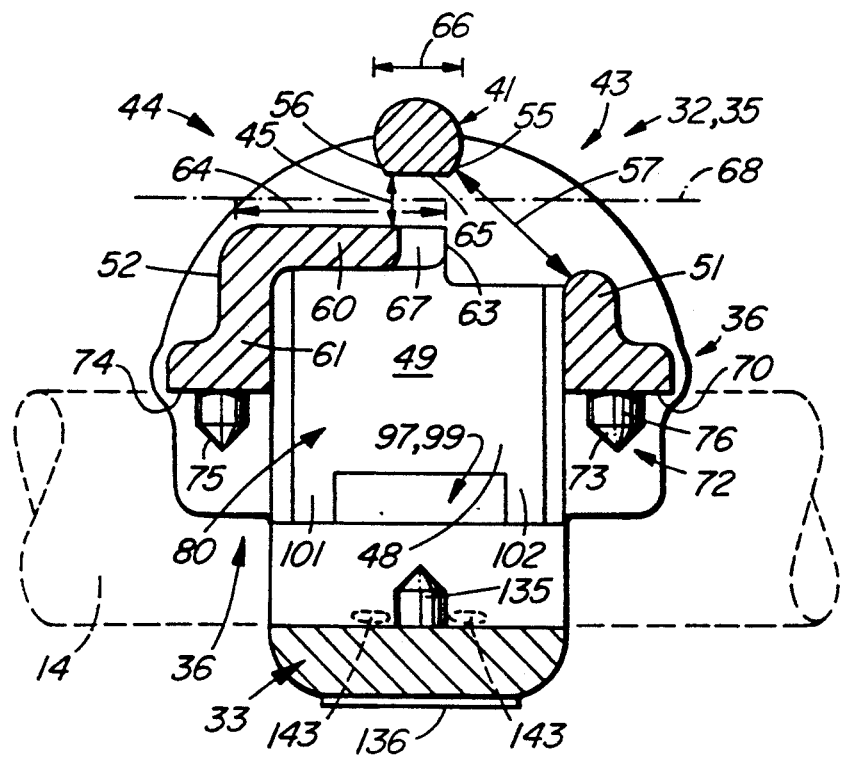
FIG. 5 is a simplified longitudinal section of the connecting apparatus, as seen on Line 5—5 of FIG. 3.

Referring mainly to FIG. 5, the body portion 32 has a cavity 49 extending from an inner opening 48 of the inner portion 36 adjacent the line 14 to the outer portion 35, so as to communicate with the outer opening 43. The body portion 32 has first and second end portions 51 and 52 respectively, inner surfaces of the end portions defining in part the cavity 49. The bridge portion 41 has first and second edge portions 55 and 56 respectively on opposite sides thereof. A space 57 between the first edge portion 55 and the first end portion 51 partially defines depth of the outer opening 43, and an oppositely located space 45 between the second edge portion 56 and the second end portion 52 partially defines depth of the locking opening 44. As can be seen, the outer opening 43 is larger than the locking opening 44 for reasons to be described. It is important that the locking opening 44 has a minimum size sufficient to receive at least two cord portions of the cord loop disposed side-by-side i.e. lying generally parallel and adjacent to each other, and a maximum size to resist passage of a second cord loop containing the first cord loop passed therethrough as will be described.

Figure 6:
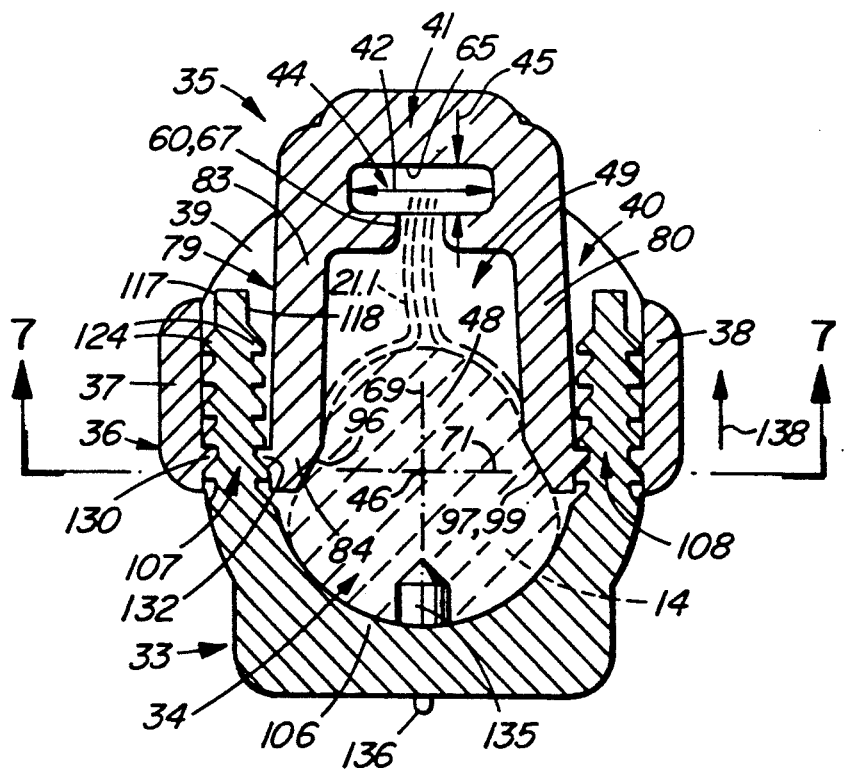
FIG. 6 is a simplified fragmented cross section of the apparatus shown connected to a line, as would be seen from Line 6—6 of FIG. 2.

As seen in FIG. 6, the opening 44 is generally rectangular or partially oval-shaped to accept two circular cross-section cords disposed side-by-side. For a cord of a size 2 mm, the opening 44 has a width 42 of 7.6 mms, and the depth 45 is 2.8 mms. Typically, the opening could have a size approximately 5 to 10 percent smaller than that specified, and the cord may be larger, provided two portions can pass simultaneously through the locking opening 44. Clearly, compressibility of the cord is a factor in determining maximum size of the cord, and clearly the opening should be able to accommodate cord that is slightly larger in size than depth of the opening. The cord loop 21 can be fabricated from synthetic thread, e.g. commercially available braided nylon cord, which is relatively soft and compressible but has a rough or high friction surface which is prone to tangling with the net web. Alternatively, the loop 21 can be a nylon monofilament, which is relatively stiff and incompressible but has smooth, low friction surface, and is less liable to cause tangling of the net web. Furthermore, soft braided cord is more likley to inadvertently tangle with the connecting means than a relatively stiff nylon monofilament. In this regard, it is noted that the connecting means is generally spherical in shape so as to minimize corners and projections, which reduces chances of the cord, or the monofilament, or the net web, from tangling with the connecting means. Thus, all portions of the connecting means are smoothly radiused and project minimally from the overall spherical shape. The opening has a size which is sufficient to permit a relatively easy threading of a cord loop through the opening without requiring any special tooling, thus enabling a fisherman to re-hang a net easily. When determining the size of the opening it should be borne in mind that when a braided cord is subjected to tension, its diameter is reduced considerably, and thus the cord diameter should be gauged when the cord is under tension.

Figure 8:
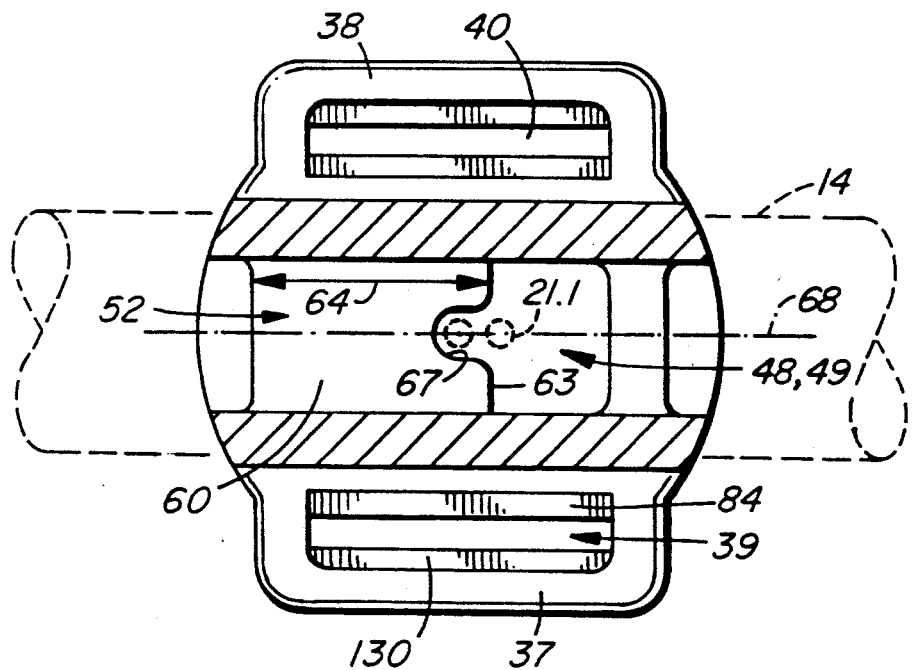
FIG. 8, is a simplified section on Line 8—8 of FIG. 3, showing a fragmented top plan of the apparatus with a bridge portion thereof removed.

As seen in FIGS. 5, 6 and 8, the second end portion 52 is generally L-sectioned and has a base portion 60 extending from an adjacent end wall 61 to a distal edge portion 63 of the second end portion. It can be seen that the space between the bridge portion 41 and the adjacent base portion 60 defines the depth 45 of the locking opening 44 of a cord securing means as will be described. The distal edge portion 63 is disposed oppositely to an inner face 65 of the bridge portion 41 which provides the locking opening 44. The distal edge portion 63 defines a portion of the outer opening and is closely adjacent the first edge portion of the bridge portion to provide essentially unobstructed communication between the locking opening and the outer opening for reasons to be described. The distal edge portion has a clearance recess 67 to provide clearance for the cord loop 22.1 (broken outline in FIGS. 6 and 8 only), passing outwardly through the cavity 49 of the connecting. The base portion has a depth 64 and extends over a large portion of an outer end of the cavity 49, thus reducing size of the opening 43 to prevent chances of obstruction of the locking opening 44 as will be described. The bridge portion has a depth 66 which is considerably narrower than depth of the base portion 64, and the bridge portion is disposed asymmetrically with respect to the base portion to provide a relatively large lead-in surface on a side of the bridge portion remote from the outer opening for reasons to be described. It can be seen that the bridge portion 41 and the base portion 60 have the depths 66 and 64 respectively which are spaces between opposite edges thereof as measured along a central axis 68 of the locking opening 43. As seen in FIG. 6, the line receiving opening 34 has mutually perpendicular first and second axes 69 and 71 which intersect the central longitudinal axis 46 of the apparatus.

Referring to FIGS. 3 and 5, the first end portion 51 has a concave seat portion 70 which is generally complementary to a surface of the support line 14 to receive the line therein. The seat portion 70 has a projection 72 extending therefrom and penetrating the line when the line is forced into the seat portion as will be described. The projection 72 has a generally conical outer end portion 73 which assists in penetrating the line, and a cylindrical inner portion 76 which is embraced by the line when so penetrated. Similarly, the second end portion 52 has a similar seat portion 74 and a similar projection 75 also adapted to penetrate the line. Thus, it can be seen that the inner portion 36 of the body portion has seat portions as described which, when the body portion is secured to the line, resists axial and rotational movement of the body portion relative to the line.

Figure 7:
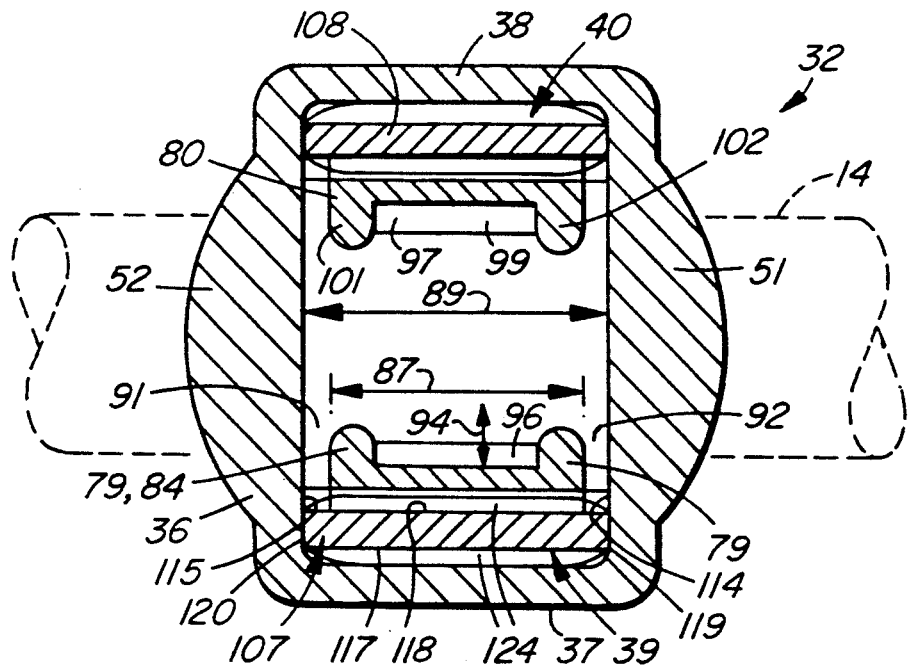
FIG. 7 is a simplified section on Line 7—7 of FIG. 6, a portion of the line being shown in broken line.

Referring to FIGS. 6 and 7, the body portion 32 has first and second fingers 79 and 80 respectively, the fingers forming a pair of generally parallel fingers spaced apart to receive a portion of the line 14 therebetween adjacent the inner opening 48 of the body portion. The first finger has a finger proximal portion 83 connected to the adjacent body outer portion 35, and a finger distal portion 84 adjacent the inner portion 36 and the line 12. As seen in FIG. 7, the first finger 79 has a width 87 which is less than space 89 between inner faces of the opposing end portions of the body portion. Thus, clearances 91 and 92 exist adjacent opposite edges of the finger 79. Thus, the finger distal portion 84 is separated from and extends freely relative to the adjacent body portion to permit slight lateral flexing of the finger with respect to the body portion as shown by an arrow 94, to permit cooperation with the fastener portion as will be described.

The second finger 80 is generally similar to the first finger and is disposed on an opposite side of the body portion so as to embrace an opposite side of the line. The distal portions of the fingers 79 and 80 have obliquely inclined clearance portions 96 and 97 respectively facing inwardly towards each other and towards the line. As seen in FIGS. 5, 6 and 7, the clearance portion 97 has an inclined surface 99 spaced between a pair of marginal portions 101 and 102 which have shoulders defining outer edges of the clearance portion 96 and the finger 80. The clearance portion 96 is generally similar, and thus is not described in detail. Portions of the cord loop 21.1 are shown in broken outline in FIG. 6 where they pass around the line 14, and are received in the clearance portions 96 and 97 of the fingers 79 and 80 and thus tend to resist movement along the line as will be described.

Referring again to FIG. 6, the fastener portion 33 is initially a separate piece and is generally U-shaped and has an inner portion 106 with a semi-circular inner wall of a diameter similar to diameter of the line 14. The fastener portion also has first and second generally parallel fastener end portions 107 and 108 extending therefrom and cooperating with the first and second transversely spaced fastener openings 39 and 40. The openings 39 and 40 are disposed between the first side portion 37 and first finger 79, and the second side portion 38 and second finger 80 respectively. Thus, the openings 39 and 40 have generally parallel side walls defined by opposed faces of the portion 37 and the finger 79, and opposed faces of the portion 38 and the finger 80 respectively.

As best seen in FIG. 7, the opening 39 also has spaced apart generally parallel end walls 114 and 115, to define with the parallel side walls thereof a fastener opening having a generally rectangular cross section. Space between the end walls of the opening 39, namely the spacing 89, defines the opening width. The opening 40 is generally similar.

Referring to FIGS. 6 and 7, the first fastener end portion 107 has a base strip having generally parallel side walls 117 and 118, and generally parallel end walls 119 and 120 to define a generally rectangular cross section base strip. A space between the end walls 119 and 120 defines width of the end portion 107, which is essentially constant along length of the fastener end portion and slightly smaller than the space 89 to reduce excessive movement of the end portion in the opening.

As best seen in FIG. 6, the side walls 117 and 118 are provided with a plurality of rack teeth 124 extending outwardly from the base strip towards the side walls of the opening 39. As best seen in FIG. 7, the teeth 124 extend across the width of the end portion, so as to have a tooth length generally equal to width of the end portion to provide a maximum bearing length. It can be seen that the teeth are raised from both faces of the base strip to form a double-sided rack, and the sides of the rack are bounded by the end walls 119 and 120 which are flat and without teeth.

As seen in FIG. 6, an inner side wall of the first side portion 37, i.e. of the fastener opening 39, has a pawl member 130 extending therefrom, and the finger distal portion 84 has a similar pawl member 132 extending therefrom. While it can be seen that the opening 39 has a pawl member extending from each side thereof towards each other, the invention would still be operative with only one pawl member, which would require correspondingly only one set of teeth on one side of the fastener end portion. However, for symmetrical gripping of the end portion within the fastener opening, two pawl members disposed oppositely to each other as in 130 and 132 are preferred, which would require rack teeth on both sides as shown. Thus, each fastener opening has a side wall having at least one pawl member extending therefrom, and into the fastener opening to engage the rack teeth when the respective fastener end portion is inserted therein.

As also seen in FIG. 6, the rack teeth 124 on the end portions are inclined with a "barb-like" profile, having a shallowly and rearwardly inclined forward facing edge, and a steeply inclined rear facing edge to facilitate insertion of the fastener end portion into the respective opening. The pawl members 130 and 132 have similar complementary profiles to smoothly receive the forward facing edge of the fastener end portion when inserted therein, and to provide an increased resistance to removal of the fastener end portion due to the steeply inclined complementary rear faces thereof. It can be seen that the pawl members 130 and 132 and the rack teeth 124 serve as rack and pawl means cooperating with the fastener end portions and the respective fastener openings to permit insertion of the end portion into the respective opening per an arrow 138 (FIG. 6), and to resist removal of the end portion from the respective opening in an opposite direction. Thus it can be seen that the fingers 79 and 80 are located adjacent the fastener openings 39 and 40 respectively to permit cooperation with the respective fastener end portions 107 and 108 so as to force the fingers inwardly when the fastener end portions are inserted into the fastener opening. This is to resist the natural tendency of the fingers to move outwardly when forced onto the line as will be described.

As seen in FIGS. 3, 5 and 6, the fastener portion 33 has a projection 135 extending therefrom and penetrating the support line when the line is fitted into the fastener portion. Similarly to the projections 72 and 75 of the body portion, the projection 135 of the fastener portion has a generally conical outer portion and a cylindrical inner portion. Also, an outer portion of the fastener portion 33 has a marker 136 which is a straight raised projection extending along a central axis of the fastener portion and is used to align fastener portions with respect to the support line while being secured thereto, as will be described.

OPERATION

FIGS. 1, 5, 6, 7, 9 and 10

The connecting means 20 according to the invention is secured to the support lines, namely the float line 12 and the weight line 14, by cooperation between the rack and pawl means in the fastener end portions and the fastener openings in the body portion. Once the fastener end portions are secured inside the body portion, it is essentially impossible to separate the body portion from the fastener portion without destroying one or both of the portions. Also, once fully connected, it is essentially impossible to move the connecting means along the line. Thus, it is essential that the two portions be positioned accurately at a desired location on the line prior to full engagement of the fastener portion with the body portion. Thus the support line is preferably marked to show locations of the connecting means thereon.

Figure 9:
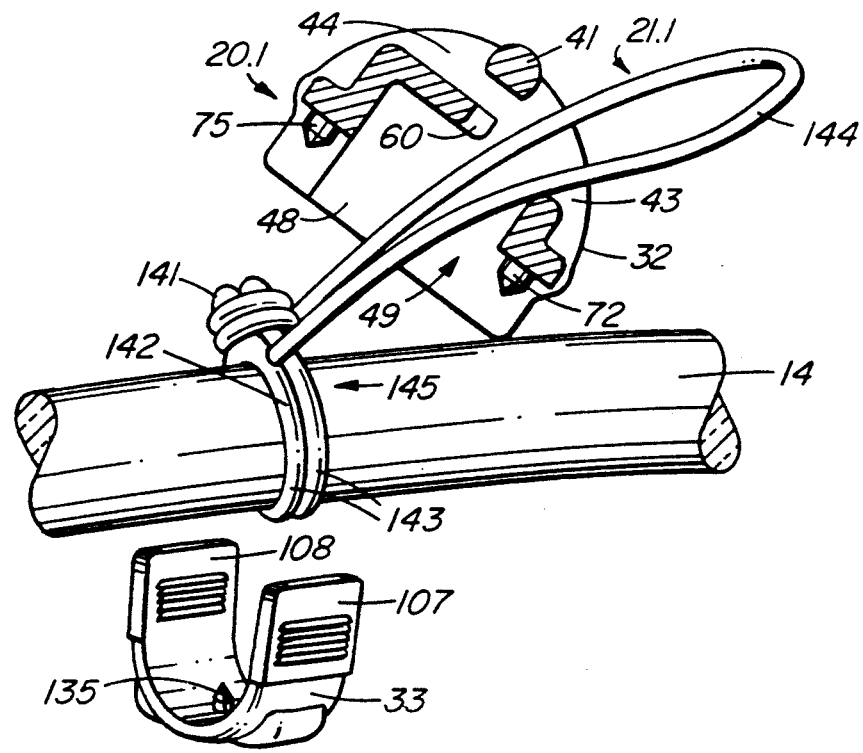
FIG. 9 is a simplified, partly sectioned and fragmented side elevation showing connecting a cord loop to a support line, e.g. a weight line, prior to connection of the connecting means.
Figure 10:
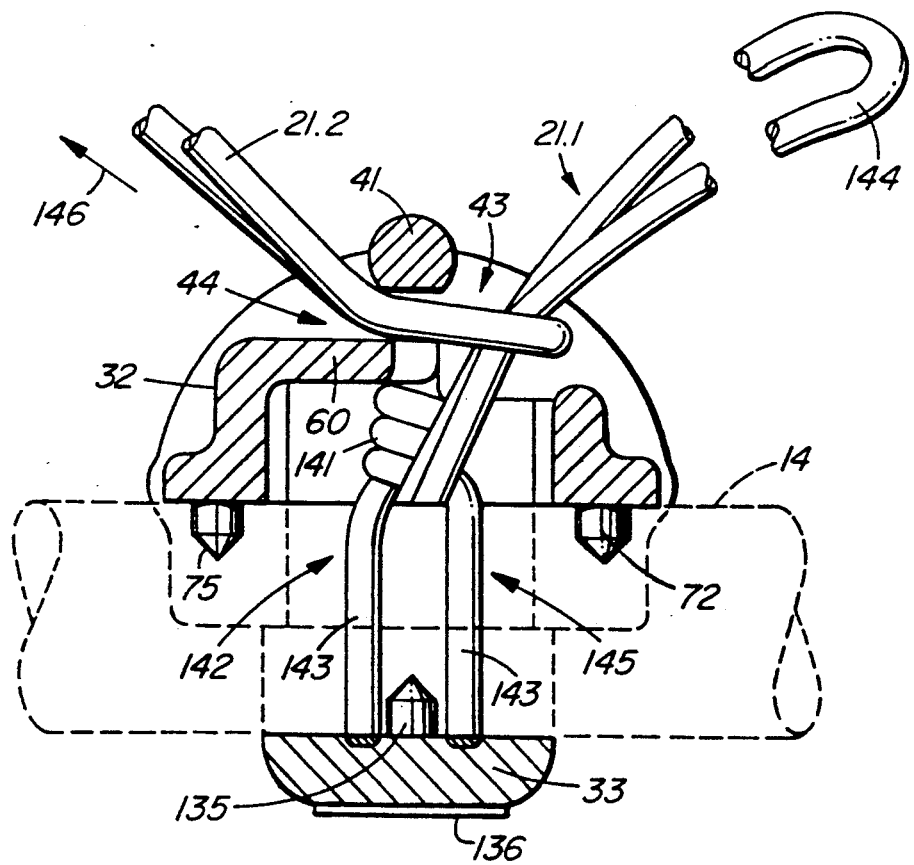
FIG. 10, is a simplified fragmented longitudinal section, generally similar to FIG. 9, showing cooperation between first and second cord loops at one connecting means.

Initially, a plurality of cord loops 21 is fabricated from equal lengths of soft flexible braided cord or nylon monofilament, having sufficient strength to secure the net web as is common practice. To form each loop opposite ends of the lengths of cord are connected together by a simple thumb knot, a fisherman's knot, or other means designated 141, termed stop means, to connect the ends together to form the loop 21. In an alternative not illustrated particularly for the nylon monofilament, the ends of the cord can be secured together by an alternative stop means produced in a plastic injection process. Irrespective of the means of connecting, as seen in FIGS. 9 and 10, a portion of the cord adjacent the joining of the ends of the cord is defined as an inner loop end portion 142, and an oppositely located portion is referred to as an outer loop end portion 144. The loop has a length which is greater than spacing 22 (FIG. 1) between adjacent connecting means on the line, when portions of the loop are held closely against the line other and the line is stretched. Thus, the cord loop has a taut length of about 30 centimeters (12 inches) for use with connecting means spaced apart at about 20 centimeters (8 inches) on a support line of about 12.7 millimeters (nominal ½ inch) diameter.

The support line has an axially extending contrasting thread or other longitudinal mark, not shown, which extends as a straight line along one side of the support line, and thus does not twist around the support line as a normal thread. This mark is used to facilitate accurate positioning of the connecting means and associated cords to extend from one side of the support line only, so as to prevent the connecting means from following a twist on the line. This ensures that the net web will hang smoothly from the line without being wrapped therearound. Such a longitudinal mark is commonly found on float lines and weight lines and requires no further description. It is common practice to ensure that a net web is hung at equally spaced locations along the line to ensure correct size openings in the web, and the line can be marked at equal spacings along its length to ensure that the connecting means are connected to the line at equal spacings.

A particular or first loop 21.1 of cord is connected at a correct location on the line by wrapping the inner loop end portion 142 of the cord around the line, followed by passing the outer loop end portion 144 of the line through the inner loop end portion 142 to secure the cord loop to the line by use of a ring knot 145. Preferably, the knot 141 or other stop means of securing the ends of the cord together is adjacent the line where the cord leaves the line as seen in FIG. 9. Thus, the knot 141 is adjacent the line at the position where the outer cord loop end portion extends from the ring knot 145 and the line 14 for reasons to be described. The outer loop end portion 144 is then threaded through the body portion 32 of the connecting means by insertion into the opening 48, through the cavity 49, and passing the outer loop end portion through the outer opening 43. The body portion is then moved towards the line so that the first and second fingers 79 and 80 embrace the line and the knot 141 is received through the inner opening 48 and into the cavity 49 so as to be fully enclosed by the cavity, and positioned beneath the base portion 60. In this way, the knot 141 is fully enclosed by the connecting means and is not positioned on an outer portion of the loop extending from the connecting means, and thus cannot foul the net. Clearly, while it is not necessary for the knot 141 to be adjacent the knot 145 for securing the cord to the line, if the knot 141 were located on a portion of the cord extending from the connecting means it would be prone to fouling the fine mesh of the net web 16. The knot 145 has a pair of generally parallel turns 143 of the inner end portion 142 of the cord loop which pass around the line and are received within the oppositely facing clearance portions 96 and 97 of the fingers (See FIGS. 6 and 7). The body portion 33 is then forced onto the line 14 so that the projections 72 and 75 (FIG. 5) initiate penetration of the line, thus locating the body portion with respect to the line.

The fastener portion 33 is then positioned so that the fastener end portions 107 and 108 are aligned with and adjacent to the respective first and second fastener openings 39 and 40 respectively. The fastener end portions 107 and 108 are positioned to enter the respective fastener openings 39 and 40 (FIG. 6), and the fastener portion 33 is rotated with respect to the line so as to align the marker 136 with the appropriate longitudinal mark or other alignment means on the line. This ensures that all the connecting means extend from the same side of the line. The connecting means is now correctly positioned and aligned with respect to spacing along the line, and the fastener portions are further forced into the body portion, by gripping between the thumb and fingers of the hand. The fastener end portions 107 and 108 are generally parallel to the first axis 69 (FIG. 6), and thus when the fastener end portions pass into the body portion, the fastener portion is seen to be generally adjustable along the first axis relative to the body portion so as to reduce size of the line receiving opening 34 along the first axis to apply a compressive force to the line along the first axis.

As seen in FIG. 10, preferably the projection 135 of the fastener portion 33 is positioned to pass between the turns 143 of the cord and then commences to penetrate the line, at which stage excessive resistance prevents further penetration of the fastener end portions into the fastener openings. The device can then be inverted in a suitably shaped saddle or support, for example a pair of closely spaced jaws of a vice, not shown, and the fastener portion can then be hammered or pressed so that the fastener end portions pass further into the respective openings to augment securing the connecting means to the line. Once the connecting means has been correctly located with respect to the cord loop and the line, the actual squeezing together of the fastener portion and body portion can be performed automatically or semi-automatically in a press or other means. Automation at this stage of the process would ensure uniformity of squeeze forces, and reduce labour costs.

It is emphasized that a portion of the inner loop end portion 142 passing around the line 14 is flattened and sandwiched between the fastener portion 33 and the line 14 and forced thereinto by the hammering, preferably with the projection 135 passing between the two cord turns 143, as shown in broken outline in FIG. 5 and in full outline in FIG. 10. Thus, the connecting means 20 fully encloses the inner end portion 142 of the loop as it passes around the line. The ring knot 145 is not sufficient by itself to prevent axial movement of the inner end portion along the line. However, when the inner loop end portion of the knot 145 is enclosed by the connecting means, axial movement of the cord is prevented. Thus, it can be seen that, after securing the cord to the line, the method includes positioning the connecting means to enclose the inner end portion of the cord loop so that the inner end portion is sandwiched between the line and the connecting means. The connecting means is further tightened to firmly embrace the line so that the inner end portion is trapped between the line and the connecting means, thus essentially eliminating any further movement of the inner end portion with respect to the line. As best seen in FIG. 10, the knot 141 is snugly located beneath the base portion 60 and an adjacent opposing portion of the line, thus preventing loose ends of the knot 141 from projecting from the opening 43. As best seen in FIG. 8, the two portions of the cord 21.1 pass through the clearance recess 67 in the base portion 60 and are disposed axially with respect to the connecting means. Clearly, tension applied to the cord loop cannot pull the knot 141 off the line as tension increases a tendency for the knot 141 to be drawn closer onto the line. Oblique forces applied to the cord loop and their affects are described in greater detail with reference to FIGS. 11 and 12.

Also, as best seen in FIG. 6, the cross section of the line 14 is distorted by the force of the distal end portion of the fingers 79 and 80 and the end portion 106 as the fastener end portions are driven into the respective fastener openings. Preferably, with no line fitted in the opening 34, the fastener end portions are not subjected to excessive outward forces tending to force the end portions away from each other when fully secured. Dimensions are selected so that, when there is no line within the connecting means, the fastener end portions can pass with negligible strain into the respective fastener openings. As the pawl members 130 and 132 are passed by the respective rack teeth on the fastener end portions, when correctly fitted, there is little tendency for a permanent outwards force to be applied to the fastener end portions. However, when a portion of line 14 is received within the connecting means, and the fastener portion is driven to fully engage the body portion, distortion and resilience in the line applies an outwards force to the distal end portions of the fingers 79 and 80. This outwards force forces the pawl members facing outwardly from the distal end portions of the fingers, for example the member 132, into the corresponding recesses between the rack teeth of the fastener end portions.

The side portions 37 and 38 prevent outward movement of the end portions 107 and 108 which in turn prevent outward movement of the fingers 79 and 80. Thus, lateral distortion of the line 14 under the compressive force applied along the first axis 69 causes the oppositely facing distal end portions of the fingers to apply a reactive compressive force onto the line 14 generally at right angles to the force applied along the first axis 69. Thus, by preventing an increase in the size of the line receiving opening 34 generally along the second axis 71, the line 14 is subjected to a compressive force along the second axis. Thus, forcing the fastener portion inwardly towards the body portion generates compressive forces on the line 14 along the two generally mutually perpendicular axis 69 and 71. This is termed bi-axial compression, and it serves to enhance gripping force on the line so as to resist movement of the connecting apparatus relative to the line. It can be seen that the fingers 79 and 80 of the body portion 32, and the fastener end portions 107 and 109 of the fastener portion 33 serve as grip enhancing means for enhancing grip of the apparatus on the line. The grip enhancing means thus cooperates with the body portion 32 and the fastener portion 33 to prevent increase in size of the line receiving opening 34 along the second axis 71.

When in normal use, the line 14 is subjected to tension, which generates secondary forces in the rope tending to cause the cross section of the rope to revert back into a circular cross section before it was distorted by the connection means. These secondary forces are relatively high, and augment the outwards forces applied to ends of the fingers, thus further compounding engaging forces between the pawl members and the rack teeth. It can be seen that the first and second fastener openings are defined in part by first and second inner side wall portions, i.e. the fingers 79 and 80, and first and second outer side wall portions, i.e. the side portions 37 and 38. Oppositely facing sides of the inner side wall portions, i.e. the inner faces of the fingers, define in part side walls of the line receiving opening 34. When the fastener end portions are forced into the fastener openings, the fastener end portions cooperate with the inner side wall portions to prevent outward deflection of the inner side wall portions to prevent increase in size of the line receiving opening along the second axis 71. The first and second outer side wall portions of the fastener openings, that is, the first and second side portions 37 and 38, cooperate with outer portions of the fastener end portions to resist outward movement of the fastener end portions 107 and 108 so as to generate the reactive compressive force on the line along the second axis 71.

In summary, as tension in the line 14 increases, the pawl members and rack teeth engage each other with correspondingly higher forces. Thus, when the fastener end portions are inserted in the fastener openings, the fingers engage the line which generates outwards forces on the fingers which are resisted by the fastener end portions and the side walls of the fastener openings. Furthermore, the outwards forces on the fingers due to flexibility of the rope, enhance gripping between the pawl members and the rack teeth of the fastener end portion, further augmenting gripping of the rope and essentially preventing movement between the connecting means and the rope. As is well known, moisture within ropes and tension in the ropes tends to decrease relative flexibility or resilience of the rope, which further contributes to gripping of the line with the connecting means. It has been found that this gripping of the connecting means applies for a relatively wide range of rope sizes. For example, one sample tested was designed for a line having a diameter of about 12.7 millimeters (nominal ½ inch), but was found to be satisfactory for lines ranging from about 11.1 millimeters (nominal 7/16 inch) through about 14.3 millimeters (nominal 9/16 inch). Thus, the same size of connecting means can accommodate lines having different nominal sizes.

The above procedure describes the method of connection of a first connecting means to the support line, after which the first cord loop extends from the first connecting means through the outer opening 43 as seen in FIG. 10. The procedure is followed for a similar second connecting means 20.2, (FIG. 1) which secures a second cord loop 21.2 to the support line so that the second cord loop extends from the second connecting means. The second connecting means is spaced from the first connecting means along the line at the distance or spacing 22 which is less than length of the second cord loop. Usually, several connecting means will be installed or secured to the line at a time, covering perhaps several meters of the line prior to connecting a portion of the web to the line. Thus, as a minimum, at least first and second lengths of cords formed into first and second cord loops respectively have respective inner loop ends cooperating with the respective first and second connecting means and the line to resist movement of the respective inner loop end portions relative to the line. Each cord loop extends outwardly through the cavity of the respective connecting means so that respective outer loop end portions extend from the respective body portions. Clearly, because all the connecting means have been aligned with the markers 136, they are on the same side of the line, so that the cord loops initially extend in a generally similar plane containing the support line. This is to avoid installing the connecting means non-aligned, which would result in "warping" the net web as is well known. The net web is then connected to a series of installed connecting means as follows.

The second cord loop 22.2 of the second connecting means passes through the selvage of the net web 16, typically two or three loops of the selvage, and then passes to the first connecting means. As seen in FIG. 10, the second cord loop 21.2 then passes through the locking opening 44 of the first connecting means, i.e. under the bridge portion 41, and passes outwardly and past the outer opening 43. As previously stated, the depth 64 of the base portion 60 is sufficient to extend over a large portion of the cavity 49, and thus retains short ends of the knot 141 within the cavity 49, thus preventing interference with the cord loop 21.2 as it passes outwardly from the opening 44. Because the base portion is disposed asymmetrically relative to the bridge portion, the relatively large lead-in surface is disposed on an inlet side of the bridge portion to initially receive the outer end portion of the loop 21.2, thus facilitating threading of the second loop through the locking opening. The first cord loop 21.1 of the first connecting means 20.1 is then passed through the outer end portion of the second cord loop 21.2 extending under the bridge portion 41 of the first connecting means, and the first cord loop 21.1 is then drawn relatively taut. FIG. 10 illustrates the relative dispositions of the first and second cord loops and the weight line 14 at this stage when generally symmetrical outwardly and upwardly directed forces are applied to the first and second cord loops as shown. It can be seen that the bridge portion is disposed asymmetrically with respect to the base portion so as to provide the relatively large lead-in surface of the base portion on the inlet side of the bridge portion remote from the outer opening to facilitate threading of the loop through the locking opening. Also, the asymmetry provides a relatively small lead-out surface of the base portion on an opposite outlet side of the bridge portion adjacent the outer opening to provide relatively unobstructed communication with the locking opening, so that the loop passing through the outer opening can be easily threaded through the loop passing through the locking opening.

Figure 11:
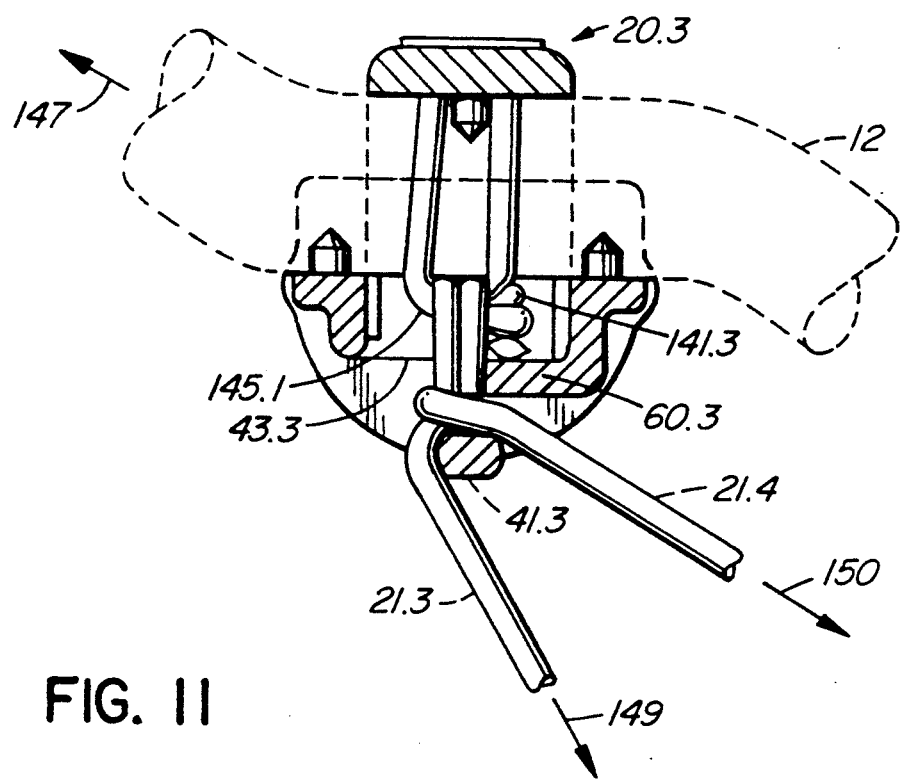
FIG. 11 is a simplified diagram, partially as a longitudinal cross section, showing a connecting means secured to a support line, e.g. float line, with forces imposed on adjacent cords being generally along a direction longitudinally of the support line.
Figure 12:
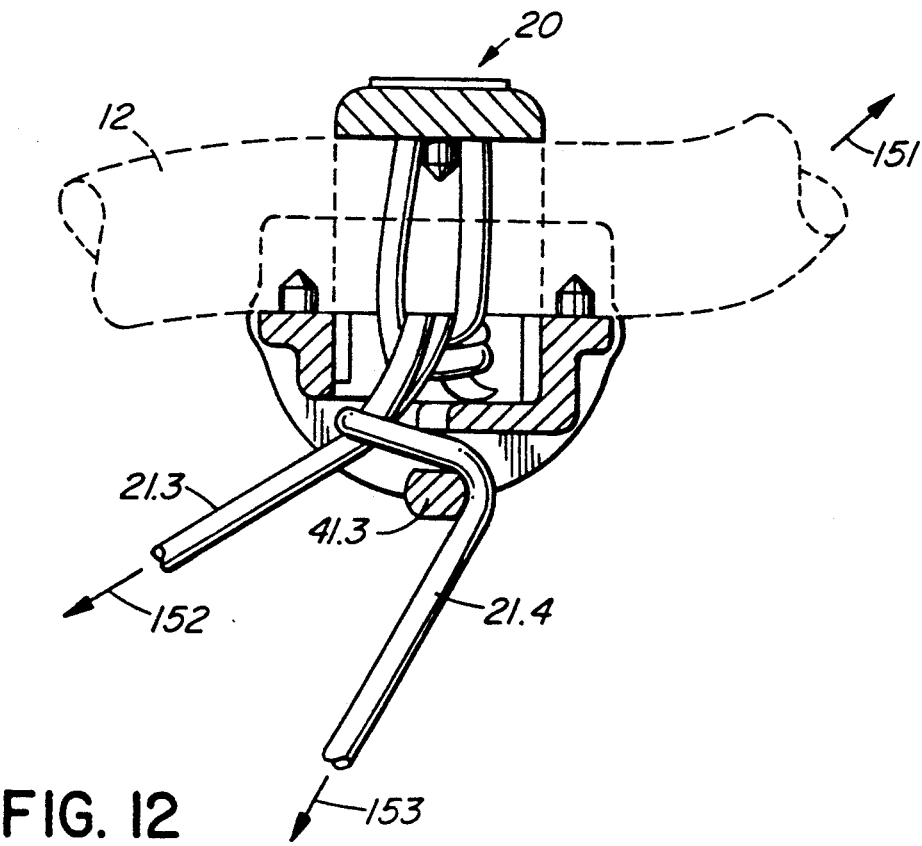
FIG. 12 is a simplified diagram generally similar to FIG. 11, with forces on the cords being in an opposite direction along the float line.

Then, a slight force is applied to the second cord loop 21.2 in direction of an arrow 146, which draws an engaged portion of the first cord loop 21.1 slightly towards the first connecting means 20.1 until the first cord loop 21.1 contacts the bridge portion. Because the locking opening 44 has a size to resist passage of the second cord loop with the first cord loop passed therethrough, an interference occurs at the opening 44 which locks the second cord loop 21.2 with respect to the first connecting means by using the first cord loop 21.1. This interference or locking is best seen in FIGS. 11 and 12 and is of major importance to the invention as it essentially prevents unintentional separation of the second loop from the first connecting means which might otherwise occur if the first cord loop broke. Thus, this locking of the two cord loops in the locking opening prevents uncontrolled unravelling of the web from the line and provides a major advantage over the prior art. This advantage clearly results from the selection of the relative sizes of the locking opening 44 and the size of the cord loops. Clearly, if the first cord loop broke where it was gripped by the second cord loop, only those particular first and second cords would be lost or separated from connecting means 20.1. It can be seen that the locking opening and its surrounding structure serves as a cord securing means for securing the second cord loop to the first connecting means with the first cord loop.

The above describes the connecting of a fish net web to a support line e.g. the weight line, adjacent one selvage of the fish net web. Clearly, a similar procedure would be followed to connect the opposite selvage to an adjacent support line, for example the float line. When so connected, the net web can extend between the support lines in a normal manner to permit normal fishing. The connecting means are of a size and shape to produce minimal interference with normal fishing operations. It can be seen that the connecting means is generally spherical in shape, and that any corners or sharp edges that might foul with a fine net web have been essentially eliminated. Furthermore, the material selected for the connecting means is preferably a tough and rigid injection moldable plastic such as Nylon (Trade Mark) or equivalent thermoplastic or thermoset composition. The material is sufficiently stiff and strong to withstand high compressive loads when the lines and connecting means are wound on to the conventional gill-net reel. As is well known, considerable tensile forces are applied between the fish net and the support lines during handling of the fish net, particularly when loaded with fish.

It can be seen that the cord loops are directly secured to the lines and thus force in the cord loops are sustained ultimately by the line. However, while the force is transferred to the line, considerable forces can be transferred to the bridge portion, particularly when oblique forces are imposed on the nets, for example when hauling a net loaded with fish into the net. The bridge portion must be sufficiently rigid to resist deformation under such loads. Clearly, the connections between the cord loops and the line, and the connecting means and the line must be sufficiently strong to resist these forces.

FIGS. 11 and 12

Referring to FIG. 11, the float line 12 is shown in broken outline with a connecting means 20.3 connected thereto with a bridge portion 41.3 positioned as shown below the line 12. An inner end portion of a cord loop 21.3 is connected to the line 12 by a ring knot 145.1 and extends outwardly through the outer opening 43.3 and passes through a cord loop 21.4 extending from an adjacent connecting means, not shown. Pull on the float line 12 is shown as an arrow 147, which is in a generally opposite direction to pull imposed on the cords 21.3 and 21.4 shown in direction of arrows 149 and 150 respectively. It can be seen that the cord 21.3 in particular imposes high lateral loads on the bridge portion 41.3.

Referring to FIG. 12, the same connecting means 20.3 is shown with a reversal of forces. Thus direction of load applied to the float line is shown as an arrow 151, and load applied to the net is transferred to the cord lines 21.3 and 21.4 in directions of arrows 152 and 153 respectively. In this direction of force, the cord 21.3 is carrying most of the load and pulls the cord 21.4 outwardly or downwardly against the bridge portion 41.3, thus transferring some of the load onto the line 21.4.

In either directions of forces shown in FIGS. 11 and 12, it can be seen that the bridge portion 41.3 is subjected to relatively high loads and must be designed accordingly to withstand such loads. Samples of this invention have been tested extensively on a gill netter, and have been used successfully in many sets, with negligible movement of the connecting means relative to the line, or breakage of the cords on bridge portions.

Clearly, when the net web is to be removed from the support lines, the connecting procedure can be reversed by simply drawing the cord loops apart at each connecting means, to permit separation of a cord loop of one connecting means from an adjacent connecting means so as to permit separation of the cord loop from the selvage of the net. The net can be quickly separated from each line, and replaced with another fish net web as required.

ALTERNATIVES

FIGS. 13 through 16

A second embodiment of the invention is an alternative connecting means designated 160 which differs from the first embodiment 20 as previously disclosed by being mechanically far simpler, but requiring a more complex knot than a ring knot for tying the cord to the support line. In contrast with the first embodiment 20 which is directly secured to the line, the second embodiment 160 is secured to the support line by the said more complex knot tied with the cord itself, and thus additional time would be required for initially connecting the connecting means to the lines. However, once the connecting means 160 has been secured to the line, it is considered that the hanging of the net from the connecting mans would take approximately the same amount of time as with the means 20. The immediate advantage of the second embodiment over the first embodiment is that it is considerably less costly to produce, mechanically simpler and probably less prone to problems once it has been secured to the support line. Also, it can be removed from the line by cutting the cord or untying the knot.

Figure 13:
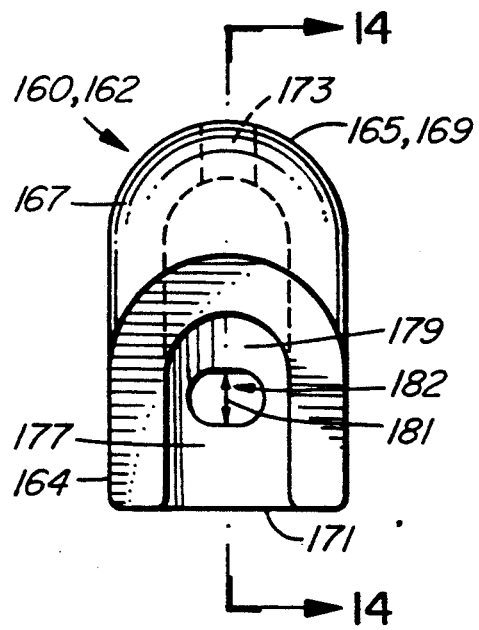
FIG. 13 is a simplified front elevation of an alternative connecting means or second embodiment according to the invention.
Figure 14:
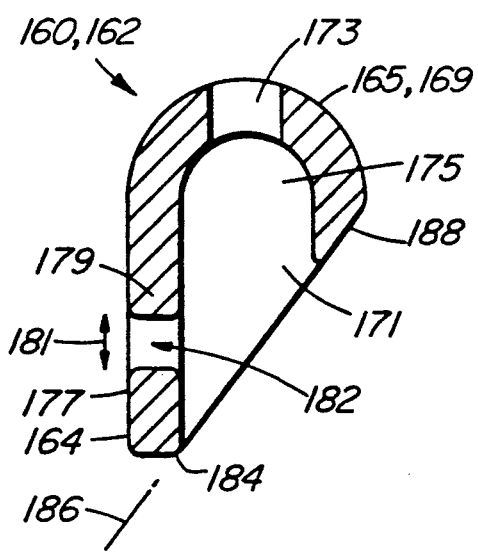
FIG. 14 is a simplified fragmented section on Line 14—14 of FIG. 13.

Referring to FIGS. 13 and 14, the second embodiment of the connecting means 160 has a body portion 162 having an outer portion 164 and an oppositely located inner portion 165. The body portion 162 has a tubular side wall 167 extending between the inner and outer portions thereof, and at the inner portion has an end wall 169 thus providing a bell-like appearance. The outer portion has an outer opening 171 and the inner portion 165 has an inner opening 173 in the end wall 169 which is disposed closest to the line. A cavity 175 extends from the inner opening 173 to the outer opening 171.

The outer portion has a bridge portion 177 and an adjacent base portion 179, space 181 between the bridge portion and the base portion defining depth of a locking opening 182. The outer portion of the body portion has a rim 184 which is disposed within an inclined plane 186 to provide a truncated end to the tubular side wall. The locking opening is located in a portion of the side wall furthest from the inner portion 165 of the body. A portion 188 of the rim closest to the side wall is disposed diametrically opposite to the locking opening 182, to provide a clearance portion to facilitate threading a cord through the locking opening and cooperation with cord portions as will be described. The opening 182 is generally rectangular or oval-shaped and is similar to size and shape to the opening 44 of FIGS. 2 through 8. Consequently, the opening is of a size sufficient to permit a fisherman to pass a loop of cord therethrough easily without requiring special equipment. In contrast, for reasons to be described, the inner opening 173 has a size which is considerably smaller than the size of the locking opening 182.

Figure 15:
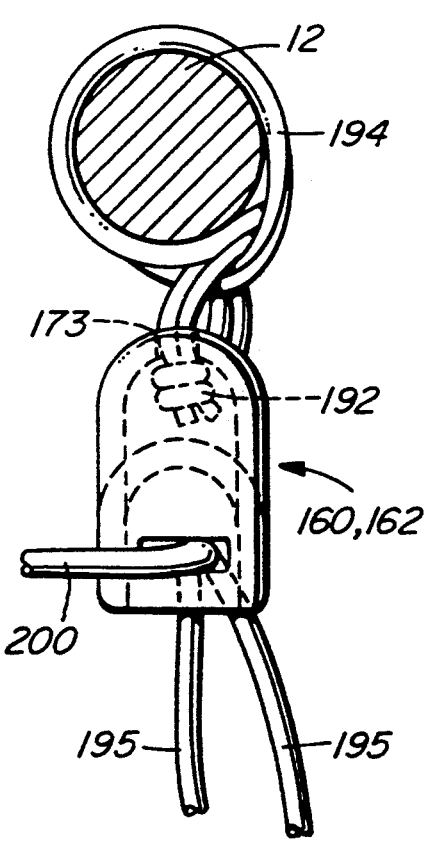
FIG. 15 is a simplified rear elevation of the alternative connecting means of FIG. 13, shown cooperating with a line in section and respective cord loops, a knot in the cord loop being knotted loosely prior to setting.
Figure 16:
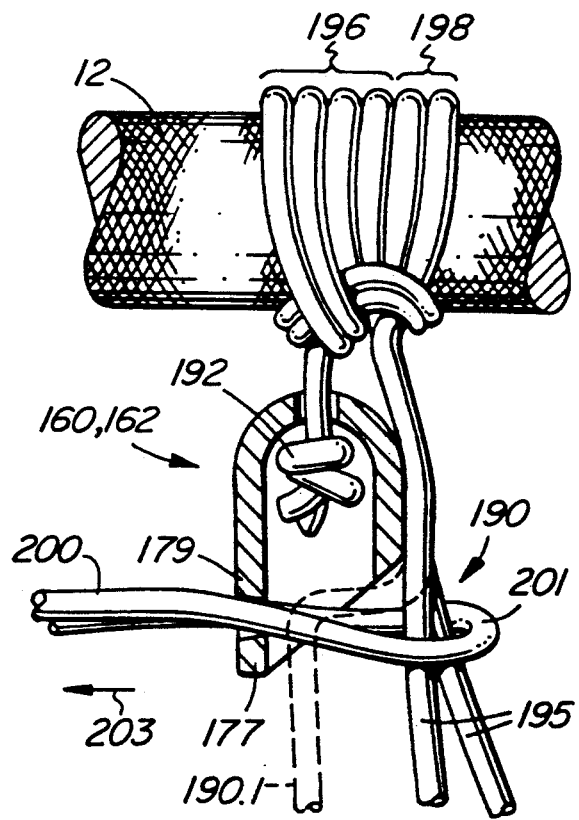
FIG. 16 is a simplified cross section of the line of FIG. 15, showing the connecting means partially in section and cooperating with the line and the adjacent cord loops.

Referring to FIGS. 15 and 16, a first cord loop 190 is formed from a length of cord in which the ends thereof have been connected by a thumb knot 192 or other stop means to secure cord ends together to form the loop. The thumb knot 192 is positioned adjacent an inner loop end portion 194, and an outer loop end portion 195 is passed through the inner opening 173 of the means 160, and pulled therethrough until the thumb knot 192 contacts the end wall 169. The inner opening 173 has a size sufficient to receive the two portions of end portion of the cord disposed side-by-side, but is too small to permit the knot 192 to pass therethrough. Because the inner loop end portion will be subjected to high tensile forces, which cause the cord to contract, it is essential that the knot cannot be pulled through the inner opening 173 under high forces. Consequently, size of the opening 173 is somewhat smaller than sum of the sizes of two cord portions disposed parallel to each other, that is side-by-side and thus a broad needle, bodkin or other threading device would be required to facilitate threading of the cord loop through the inner opening. If a thumb knot is too small, a figure-of-eight knot, or plastic injected stop or other stop means, or even a washer, can be threaded on the loop to ensure that the knot cannot be pulled through the opening. Thus, the knot serves as a stop means and this serves to secure the connecting means 160 to the cord loop and thus to the line as follows.

The connecting means 160 is located closely adjacent the line 12 at an appropriate place, and the remaining portion of the inner loop end portion 194 is used to form a clove hitch 196, doubled, around the line. A conventional locking half hitch 198, also doubled, is then used to secure the clove hitch. The remaining outer end portion 195 of the loop extends from the line generally adjacent the connecting means 160.

A second cord loop 200 from an adjacent connecting means, not shown, similarly secures the adjacent connecting means to the line and has an outer loop end portion 201 which passes through the locking opening 182 of the connecting means 160. Thus, the locking opening 182 has a minimum size sufficient to receive at least two cord portions of the second cord loop disposed side-by-side as before described. The outer loop end portion 195 of the first cord loop then passes through the outer loop end portion 201 of the second cord loop as best seen in FIG. 15.

Similarly to the method described for the previous embodiment, if force is applied to the second cord loop 200 in direction of an arrow 203, the first cord loop 190 moves inwardly as shown in broken outline at 190.1 to be drawn adjacent the base portion 179 and the bridge portion 177. Similarly to the previously described embodiment, the locking opening of the securing means has a maximum size to resist passage of the second cord loop 200 containing the first cord loop 190 passed therethrough.

Clearly, similarly to the previously described embodiment, the first cord loop 190 would then pass to another adjacent connecting means to function similarly to the second cord loop 200. It can be seen that the locking openings 44 and 182, the adjacent bridge portions 41 and 177, and the base portions 60 and 179 function similarly to provide a cord securing means for securing a cord loop therein, the securing means having the locking opening of a specific size as previously described.

FIGS. 17 through 20

A third embodiment of the connecting means 205 is generally similar to the second embodiment 160 of FIGS. 13 through 16, but is particularly adapted for manufacturing by injection molding. Consequently, geometry of the third embodiment is particularly designed to reduce tooling costs. In view of the similarity of the two embodiments, many portions of the third embodiment function equivalently to similar portions on the second embodiment.

Thus, the third embodiment 205 has a body portion 208, outer and inner portions 210 and 211 and a side wall 213 defining in part a cavity 218. The body has an outer opening 216 and a locking opening 219 adjacent the outer portion 210, and an end wall 215 with an inner opening 217 adjacent the inner portion and closest to the line (not shown). The inner and outer openings communicate with the cavity. The locking opening is adjacent the portion 210 and is defined in part by a bridge portion 221 and a base portion 223, space between the bridge portion and base portion defining width 225 of the locking opening 219. The sidewall 213 has a rim 226 disposed within an inclined plane, the locking opening being located adjacent a portion of the rim furthest from the inner wall as in the previous embodiment.

In contrast to the second embodiment 160, the base portion 223 of the third embodiment has a relatively large lead-in surface 228 which facilitates threading of a loop end portion through the opening 219 in direction of arrow 229. A knot 232 (broken line) of a respective cord is within the cavity 218 and held adjacent the inner opening 217 and is enclosed between the end wall 215, the side wall 213 and the base portion 223, and thus is more securely held within the cavity 218 of the body portion than in the second embodiment. Furthermore, similarly to the base portion 60 in the first embodiment, the base portion 228 of the third embodiment extends partially across the cavity 218 and prevents end portions of the knot 232 from projecting adjacent the locking opening, which would increase difficulty of threading a cord loop through the locking opening 219.

Figures 17, 18:
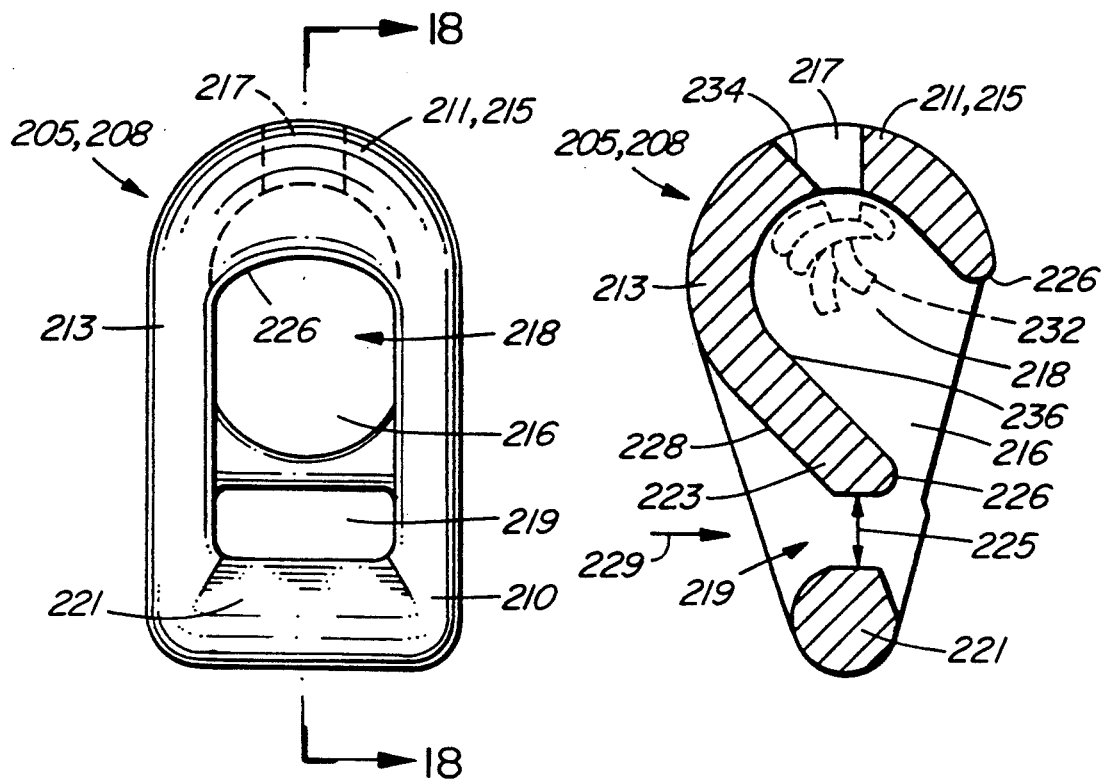
FIG. 17 is a simplified front elevation of a third embodiment of a connecting means according to the invention.
FIG. 18 is a simplified fragmented section on line 18—18 of FIG. 17, a knot being shown in broken outline.
Figures 19, 20:
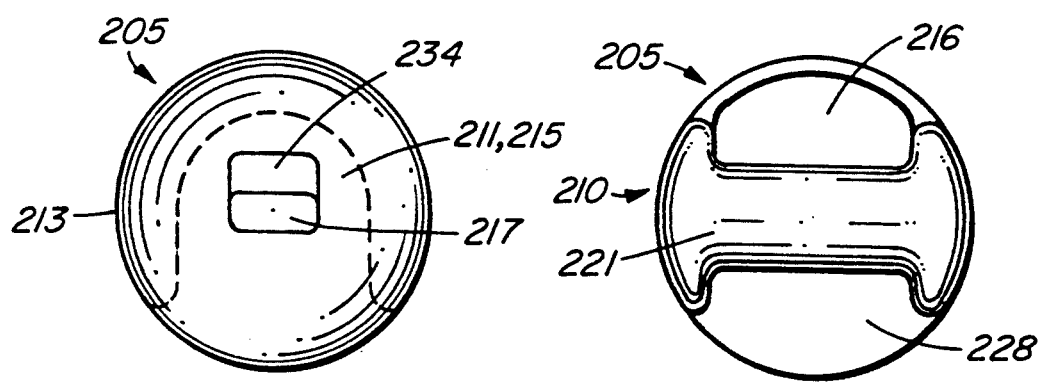
FIG. 19 is a simplified top plan view of FIG. 17, some hidden detail being shown.
FIG. 20 is a simplified bottom plan view of FIG. 17.

It is added that the inner opening 217 has a divergent side wall 234 which is generally parallel to an inner wall 236 of the base portion, so as to facilitate extraction of the body from the injection mold as is well known in the trade. Also, the locking opening has a size in depth 225 which is at least twice the size of a narrowest portion of the inner opening 217, as best seen in FIG. 18.

The third embodiment can be secured to the line in a manner identical to the second embodiment, and functions in a similar manner to the second embodiment. It can be seen that the third embodiment is designed for easy manufacturing, and for easy threading of the loop through the locking opening by providing a lead-in surface and retaining the knot within the cavity.

We claim:

1. In combination with a support line and a net web having a selvage, an apparatus for connecting the net web to the support line, the apparatus comprising:
   (a) at least first and second connecting means spaced apart along the line at respective locations, each connecting means comprising a body portion and a respective cord securing means for securing a cord loop therein, the cord securing means having a locking opening, and
   (b) at least first and second lengths of cord formed into first and second cord loops respectively with respective inner and outer loop end portions, the first and second inner loop end portions cooperating with the first and second connecting means respectively and with the line to resist movement of the connecting means and the respective inner loop end portions along the line, the connecting means and respective inner loop end portions being spaced apart at a distance along the line less than length of the cord loop, and the second cord loop passing through the selvage of the net web and extending to the first connecting means, passing through the locking opening of the first connecting means and cooperating with the first cord loop so as to prevent separation of the second loop from the first connecting means.

2. An apparatus as claimed in claim 1, in which:
   (a) the locking opening of the securing means has a minimum size sufficient to receive at least two cord portions of the second cord loop disposed adjacent to each other and a maximum size to resist passage of the second cord loop containing the first loop passed therethrough.

3. An apparatus as claimed in claim 2, in which:
   (a) each body portion has an outer portion and an oppositely located inner portion, the inner portion being generally adjacent the support line,
   (b) the outer portion has a bridge portion and an adjacent base portion, space between the bridge portion and the base portion partially defining the locking opening of the securing means,
   (c) the inner portion having an inner opening to receive a respective cord loop therethrough.

4. An apparatus as claimed in claim 3, in which:
   (a) each body portion has an outer opening and a cavity extending from the inner opening to the outer opening to receive the respective cord loop therethrough.

5. An apparatus as claimed in claim 4, in which:
   (a) the base portion has a depth considerably greater than depth of the bridge portion,
   (b) the base portion extends over a large portion of the cavity so as to assist in retaining portions of the cord loop within the cavity, and to facilitate threading of a cord loop through the locking opening.

6. An apparatus as claimed in claim 5, in which:
   (a) the bridge portion is disposed asymmetrically with respect to the base portion so as to provide a relatively large lead-in surface on an inlet side of the bridge portion remote from the outer opening which initially receives an end of a cord loop to facilitate threading the cord loop through the locking opening.

7. An apparatus as claimed in claim 4, in which:
   (a) the body portion of each connecting means has a side wall extending between the inner and outer portions of the body and defining in part the cavity, the inner portion having an end wall with the inner opening therein, the end wall being disposed closest to the line,
   (b) each cord loop has stop means for connecting together ends of each length of cord, each stop means having a size greater than the size of the inner opening of the body portion to prevent passage of the stop means therethrough,
   (c) the inner loop end portion of the cord passes from the stop means through the inner opening of the connecting means and around the line to be secured thereto, and the outer loop end portion of the cord passes from the line past the connection means and generally adjacent the locking opening to be secured thereagainst by an adjacent cord loop.

8. An apparatus as claimed in claim 7, in which:
   (a) the outer portion of the body portion has a rim, the rim having a clearance portion disposed diametrically oppositely to the locking opening to facilitate cooperation between cord portions.

9. An apparatus as claimed in claim 8, in which:
   (a) the rim is disposed within an inclined plane to provide a truncated end to the side wall, the locking opening being located adjacent a portion of the side wall furthest from the inner end, and a portion of the rim closest to the side wall is disposed diametrically opposite to the locking opening to facilitate cooperation between the cord portions.

10. An apparatus as claimed in claim 3, in which:
    (a) each body portion has first and second end portions, and the bridge portion has first and second edge portions, space between the first edge portion and the first end portion partially defining the outer opening and space between the second edge portion and the second end portion partially defining the locking opening.

11. An apparatus as claimed in claim 10, in which:
    (a) each fastener portion has a projection extending therefrom and penetrating the support line when the line is fitted into the fastener portion.

12. An apparatus as claimed in claim 10, in which:
    (a) each connecting means includes a fastener portion which is complementary to the respective body portion, the portions having securing means for securing the portions together to enclose and grip the support line therebetween with sufficient force to resist movement of the connecting means relative to the line.

13. An apparatus as claimed in claim 12, in which each connecting means is characterized by:
    (a) the fastener portion being a length of material separate from the respective body portion and having fastener end portions at opposite ends thereof, (b) the body portion having two fastener openings to receive respective fastener end portions therein, (c) rack and pawl means cooperating with the fastener end portions and the respective fastener openings to permit insertion of the end portion into the respective opening, and to resist removal of the end portion from the respective opening.

14. An apparatus as claimed in claim 13, in which:
(a) each fastener end portion has a plurality of longitudinally-spaced rack teeth thereon,
(b) each fastener opening has a side wall having at least one pawl member extending therefrom and into the fastener opening to engage the rack teeth when the respective fastener end portion is inserted therein.

15. An apparatus as claimed in claim 14, in which:
(a) each fastener portion is generally U-shaped and has a semi-circular inner portion of a diameter similar to diameter of the support line, and a pair of generally parallel fastener end portions extending therefrom,
(b) each body portion has a pair of transversely spaced fastener openings, the openings having generally parallel side walls therein.

16. An apparatus as claimed in claim 15, in which:
(a) each fastener opening of the body portion has spaced apart, generally parallel end walls to define with the parallel side walls thereof an opening having a generally rectangular cross section, space between the end walls defining opening width,
(b) each fastener end portion has generally parallel side walls and generally parallel end walls to define a generally rectangular cross section, space between the end walls defining width of the end portion, at least one side wall of each end portion having the plurality of rack teeth extending therefrom, the rack teeth extending partially across the width of the end portion and having a tooth length less than width of the end portion to define a smooth margin portion extending along ends of the teeth, so that the teeth are raised from and bounded by the margin portions.

17. An apparatus as claimed in claim 16, in which:
(a) the fingers have outwardly facing side walls to define a side wall of the respective fastener opening, each side wall having at least one pawl member extending therefrom and into the fastener opening to engage the rack teeth of the fastener portion when the respective fastener end portion is inserted therein.

18. An apparatus as claimed in claim 13, in which:
(a) each body portion has a pair of fingers spaced apart to receive the support line therebetween, each finger having a finger proximal portion connected to an adjacent body portion and a finger distal portion, the finger distal portion being separated from the adjacent body portion to permit slight lateral flexing of the finger with respect to the remaining body portion,
(b) the fingers being located adjacent the fastener openings to permit cooperation with the fastener and portion when inserted in the respective fastener opening, so that when the fastener end portions are inserted in the fastener openings, the fingers engage the support line which generates outwards forces on the fingers which are resisted by the fastener end portions and the side walls of the fastener openings.

19. An apparatus as claimed in claim 18, in which:
(a) the distal portions of the finger have obliquely inclined clearance portions facing inwardly towards each other and towards the line, each clearance portion having an inclined surface spaced between a pair of marginal portions which have shoulders defining outer edges of the respective clearance portion,
(b) the respective inner loop end portion passes around the line and is received in the clearance portion of each finger portion.

20. An apparatus as claimed in claim 3, in which:
(a) the inner portion of each body portion has a seat portion generally complementary to a surface of the support line to receive the line therein, the seat portion having a projection extending therefrom and engaging the line when the line is forced into the seat portion to augment gripping of the line.

21. An apparatus as claimed in claim 20, in which:
(a) each body portion has two fastener openings to receive the respective fastener end portions therein,
(b) the fastener openings have generally parallel side walls and are disposed laterally relative to, and on opposite sides of, the seat portion.

22. An apparatus as claimed in claim 20, in which:
(a) each projection has a generally conical outer portion and a cylindrical inner portion.

23. An apparatus as claimed in claim 3, in which:
(a) each cord loop has a stop means securing respective ends of the lengths of cord, the stop means being located adjacent the line and within the cavity of the body portion, the stop means being located between the base portion and the line so as to be located completely within the connecting means to prevent fouling with the net web.

24. An apparatus as claimed in claim 1, in which:
(a) the inner end portions of the first and second cord loops are each connected to the support line, and are held directly thereagainst by force from the respective connecting means.

25. An apparatus as claimed in claim 24, in which:
(a) each inner end portion of the first and second cord loops is wrapped around the support line and passed through the respective cord loop so as to secure the respective cord loop to the support line with a ring knot,
(b) the fastener portions have a width greater than width of the inner end portions passed around the support line so as to augment securing of the cord to the support line.

26. A method of connecting a net web having a selvage to a support line, the method including the steps of:
(a) connecting an inner loop end of a first cord loop and a first connecting means to the support line so the inner loop end portion is restricted against movement along the support line,
(b) connecting an inner loop end portion of a second cord loop and a second connecting means to the support line so that the inner loop end portion of the second cord loop is restricted against movement along the support line, the second connecting means being spaced from the first connecting means along the support line at a distance less than length of the second cord loop,
(c) passing an outer loop end portion of the second cord loop of the second connecting means through a selvage of the net web to cooperate firstly with the first connecting means and secondly with the first cord loop so as to prevent separation of the second loop from the first connecting means to prevent any additional disconnection of the cord from the connecting means.

27. A method as claimed in claim 26, further characterized by:
(a) after passing the second cord loop of the second connecting means through a selvage of the net web, passing the second cord loop through a locking opening of the first connecting means,
(b) passing the first cord loop of the first connecting means through the outer loop end portion of the second cord loop extending through the locking opening of the first connecting means, and drawing the first loop relatively taut,
(c) applying a force to the second cord loop so as to draw the first cord loop towards the first connecting means so as to lock the outer-loop end portion of the second cord loop with respect to the first connecting means with the first cord loop.

28. A method as claimed in claim 26, in which each cord loop is connected to the line by:
(a) wrapping an inner loop end portion of the cord loop around the line,
(b) passing an outer loop end portion of the line through the inner loop end portion to secure the cord loop to the line by use of a ring knot.

29. A method as claimed in claim 28, in which:
(a) positioning the connecting means to enclose the inner end portion of the cord loop so that the inner end portion is sandwiched between the line and the connecting means,
(b) tightening the connecting means to firmly embrace the line so that the inner end portion is trapped between the line and the connecting means.

30. A method as claimed in claim 26 in which:
(a) each cord loop is first threaded through an opening of the respective connecting means and prevented from passing completely therethrough by a stop means,
(b) an inner loop end portion of the cord loop is then secured to the support line so that the connecting means is retained closely against the support line.

31. A connecting apparatus for connecting to a support line, the connecting apparatus comprising:
(a) a body portion having an outer portion and an oppositely located inner portion, the outer portion having a rigid bridge portion and an adjacent base portion, space between the bridge portion and the base portion defining depth of a locking opening of a cord securing means; the body portion also having first and second fastener openings, an outer opening adjacent the outer portion, an inner opening adjacent the inner portion, and a cavity extending from the inner opening to the outer opening,
(b) a fastener portion having first and second fastener end portions adapted to pass into the first and second fastener openings respectively to define with the body portion a line receiving opening to receive the line, the fastener portion being adjustable inwards generally along a first axis relative to the body portion so as to reduce size of the line receiving opening along the first axis to apply a compressive force to the line along the first axis,
(c) securing means for securing the two fastener end portions within the respective fastener openings, so as to secure the body portion and fastener portion together to enclose and grip the support line therebetween,
(d) a grip enhancing means for enhancing grip of the apparatus on the support line, the grip enhancing means cooperating with the body portion and the fastener portion to prevent increase in size of the line receiving opening along a second axis generally at right angles to the first axis, so that as the fastener portion moves inwardly toward the body portion a compressive force is applied to the line along the second axis which is generally at right angles to force applied along the first axis, so that forcing the fastener portion inwardly towards the body portion generates bi-axial compressive forces on the support line along the two generally mutually perpendicular axes, thus enhancing the said gripping force to resist movement of the connecting apparatus relative to the support line.

32. An apparatus as claimed in claim 31 in which the grip enhancing means are characterized by:
(a) the first and second fastener openings of the body portion being defined, in part, by first and second inner side wall portions and first and second outer side wall portions, oppositely facing sides of the inner side wall portions defining, in part, side walls of the line receiving opening,
(b) the fastener end portions cooperating with the inner side wall portions to prevent outward deflection of the inner side wall portion to prevent increase in size of the line receiving opening along the second axis.

33. An apparatus as claimed in claim 32 in which:
(a) the first and second outer side wall portions of the fastener openings cooperate with the fastener end portions to resist outward movement of the fastener end portions so as to augment compressive force on the line along the second axis.

34. An apparatus as claimed in claim 31 in which the securing means is characterized by:
(a) rack and pawl means cooperating with the fastener end portions and the respective fastener openings to permit insertion of each end portion into a respective opening, and to resist removal of the end portion from the respective opening.

35. An apparatus as claimed in claim 34 in which:
(a) each fastener end portion has a plurality of longitudinally spaced rack teeth thereon,
(b) each fastener opening has a side wall having at least one pawl member extending therefrom and into the fastener opening to engage the rack teeth when the respective fastener end portion is inserted therein, so that the rack teeth and pawl member serve as the said rack and pawl means.

36. An apparatus as claimed in claim 31, in which the grip enhancing means is characterized by:
(a) the body portion having a pair of spaced apart fingers, each finger having a finger proximal portion connected to an adjacent body portion and a finger distal portion, the finger distal portion being separated from the adjacent body portion to permit slight lateral flexing of the finger with respect to the remaining body portion,
(b) the fingers being located adjacent the respective fastener openings to permit cooperation with the respective fastener end portions so as to prevent the fingers moving outwardly away from each other when the fastener end portions are inserted into the fastener openings.

37. An apparatus as claimed in claim 36 in which:
(a) each fastener end portion has a plurality of longitudinally-spaced rack teeth thereon,
(b) the fingers have outwardly facing side walls to define a side wall of the respective fastener opening, each side wall having at least one pawl member extending therefrom and into the fastener opening so as to engage the rack teeth of the respective fastener end portion when the respective fastener end portion is inserted therein.

38. An apparatus as claimed in claim 36 in which:
(a) the distal portions of the finger portions having obliquely inclined clearance portions facing inwardly towards each other and towards the line, each clearance portion having an inclined surface spaced between a pair of marginal portions which have shoulders defining outer edges of the respective clearance portion.

39. An apparatus as claimed in claim 31 in which:
(a) the inner portion of each body portion has a seat portion generally complementary to a surface of the support line to receive the line therein, the seat portion having a projection extending therefrom and adapted to engage the line when the line is forced into the seat portion to augment gripping of the line.

40. An apparatus as claimed in claim 31 in which:
(a) the fastener portion has a projection extending therefrom and adapted to penetrate the support line when the line is fitted into the fastener end portion.

41. A connecting apparatus for connecting to a support line, the connecting apparatus comprising:
(a) a body portion having an outer portion and an oppositely located inner portion, the outer portion having: an outer opening, a rigid bridge portion and an adjacent base portion; and the inner portion having an inner opening; the body portion having a cavity extending from the inner opening to the outer opening; space between the bridge portion and the base portion defining depth of a locking opening of a cord securing means, the base portion having a distal edge portion defining a portion of the outer opening and being closely adjacent an edge portion of the bridge portion to provide essentially unobstructed communication between the locking opening and the outer opening,
(b) a fastener portion which is complementary to and engageable with the respective body portion to define a line receiving opening between the body portion and the fastener portion, so that as the fastener portion and the body portion engage each other, size of the line receiving opening is reduced to grip the support line between the body portion and fastener portion.

42. An apparatus as claimed in claim 41 in which:
(a) the bridge portion is disposed asymmetrically with respect to the base portion so as to provide a relatively large lead-in surface of the base portion on an inlet side of the bridge portion remote from the outer opening to facilitate threading, and a relatively small lead-out surface of the base portion on an opposite outlet side of the bridge portion adjacent the outer opening to provide relatively unobstructed communication with the locking opening.

43. An apparatus as claimed in claim 42 in which:
(a) the body portion has two fastener openings transversely spaced apart on opposite sides of the cavity,
(b) the fastener portion having first and second fastener end portions at opposite ends thereof, the fastener portion being adapted to pass into the respective fastener openings of the body portion so that when the fastener end portions pass into the respective fastener openings, the line receiving opening is further reduced in size,
(c) securing means for securing the end portions of the fastener portion within the respective fastener openings are provided to enclose and grip the support line therebetween with sufficient force to resist movement of the connecting apparatus relative to the line.

44. An apparatus as claimed in claim 41 in which:
(a) the bridge portion and the base portion having respective depths, the depths being spaces between opposite edges thereof as measured along a central axis of the locking opening, the depth of the base portion being considerably greater than the depth of the bridge portion, the base portion extending across an outer portion of the cavity generally adjacent the outer opening so as to partially close the outer opening of the cavity.

45. An apparatus as claimed in claim 44 in which:
(a) the distal edge of the base portion includes a clearance recess disposed closely adjacent the bridge portion and symmetrically of the locking opening, the clearance recess communicating through the base portion with the cavity.

* * * * *